US011994832B2

(12) United States Patent
Fujisawa

(10) Patent No.: US 11,994,832 B2
(45) Date of Patent: May 28, 2024

(54) ELECTRONIC WATCH

(71) Applicant: Seiko Epson Corporation, Tokyo (JP)

(72) Inventor: Teruhiko Fujisawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 486 days.

(21) Appl. No.: 17/385,019

(22) Filed: Jul. 26, 2021

(65) Prior Publication Data

US 2022/0026858 A1 Jan. 27, 2022

(30) Foreign Application Priority Data

Jul. 27, 2020 (JP) ................................ 2020-126167

(51) Int. Cl.
*G04R 20/04* (2013.01)
*H01Q 1/24* (2006.01)
*H01Q 1/27* (2006.01)

(52) U.S. Cl.
CPC ............... *G04R 20/04* (2013.01); *H01Q 1/24* (2013.01); *H01Q 1/273* (2013.01)

(58) Field of Classification Search
CPC ........ G04R 20/04; G04R 60/06; G04R 60/10; H01Q 1/24; H01Q 1/273; H01Q 1/38; H01Q 21/00
See application file for complete search history.

(56) References Cited

U.S. PATENT DOCUMENTS 8,570,838 B2 * 10/2013 Fujisawa ................ G04R 60/06 343/718
9,219,304 B2 * 12/2015 Nagahama ............. G04R 60/10
9,785,124 B2 * 10/2017 Mitani ................... G04R 60/12
2004/0217907 A1 * 11/2004 Inoue ................... H01Q 9/0464 343/700 MS
2006/0220957 A1 * 10/2006 Tanaka ..................... H01Q 1/38 343/700 R
2011/0013491 A1 1/2011 Fujisawa
2013/0242711 A1 9/2013 Fujisawa
2014/0086020 A1 3/2014 Fujisawa
2014/0126337 A1 5/2014 Fujisawa
2014/0232603 A1 8/2014 Fujisawa
2014/0240181 A1 8/2014 Mamuro et al.
2016/0054711 A1 2/2016 Fujisawa

FOREIGN PATENT DOCUMENTS

JP 2013-098923 A 5/2013
JP 2013-183437 A 9/2013
JP 2014-062845 A 4/2014
JP 2014-062850 A 4/2014
JP 2014-130159 A 7/2014
JP 2014-163666 A 9/2014
JP 2018-084494 A 5/2018

* cited by examiner

*Primary Examiner* — Edwin A. Leon
(74) *Attorney, Agent, or Firm* — Harness, Dickey & Pierce, P.L.C.

(57) ABSTRACT

An electronic watch includes an annular antenna base material including an upper surface, an outer circumferential surface, a bottom surface, and an inner circumferential surface, a first antenna element provided at the outer circumferential surface, and a second antenna element provided at the inner circumferential surface, wherein at least one of the first antenna element and the second antenna element includes a feed terminal coupled to a feed portion, and a distance between the first antenna element and the second antenna element is greater than 0 mm and less than or equal to 2 mm.

10 Claims, 13 Drawing Sheets

ELECTRONIC WATCH

The present application is based on, and claims priority from JP Application Serial Number 2020-126167, filed Jul. 27, 2020, the disclosure of which is hereby incorporated by reference herein in its entirety.

BACKGROUND

1. Technical Field

The present disclosure relates to an electronic watch that incorporates an annular antenna.

2. Related Art

An electronic watch is known that incorporates a ring antenna that receives satellite signals transmitted from a GPS (Global Positioning System) satellite (see, for example, JP-A-2013-183437).

The ring antenna of JP-A-2013-183437 discloses a structure in which an excitation element fed from a power source and a C-type loop element that is a non-feed element are provided at an inner circumferential surface and an outer circumferential surface of a circular base material having a rectangular cross-section, respectively.

JP-A-2013-183437 has a problem in that two antenna elements are separated, thereby electromagnetic coupling between the elements is weakened.

SUMMARY

An electronic watch includes an annular antenna base material including an upper surface, an outer circumferential surface, a bottom surface, and an inner circumferential surface, a first antenna element provided at the outer circumferential surface, and a second antenna element provided at the inner circumferential surface, wherein at least one of the first antenna element and the second antenna element includes a feed terminal coupled to a feed portion, and a distance between the first antenna element and the second antenna element is greater than 0 mm and less than or equal to 2 mm.

DESCRIPTION OF EXEMPLARY EMBODIMENTS

Hereinafter, an electronic watch according to exemplary embodiments of the present disclosure will be described with reference to the drawings.

Figure 1:
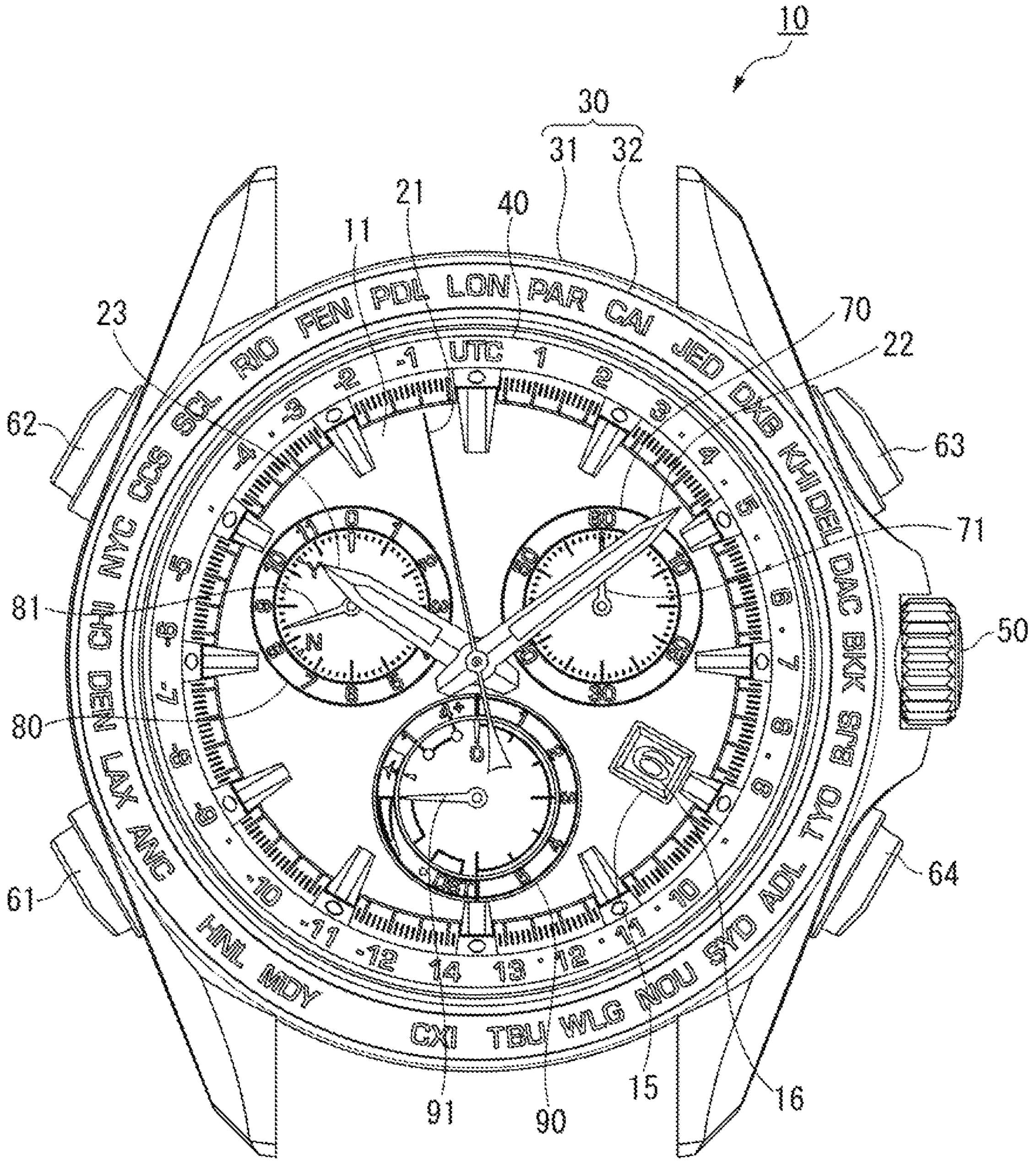
FIG. 1 is a front view illustrating an electronic watch according to an exemplary embodiment of the present disclosure.
Figure 2:
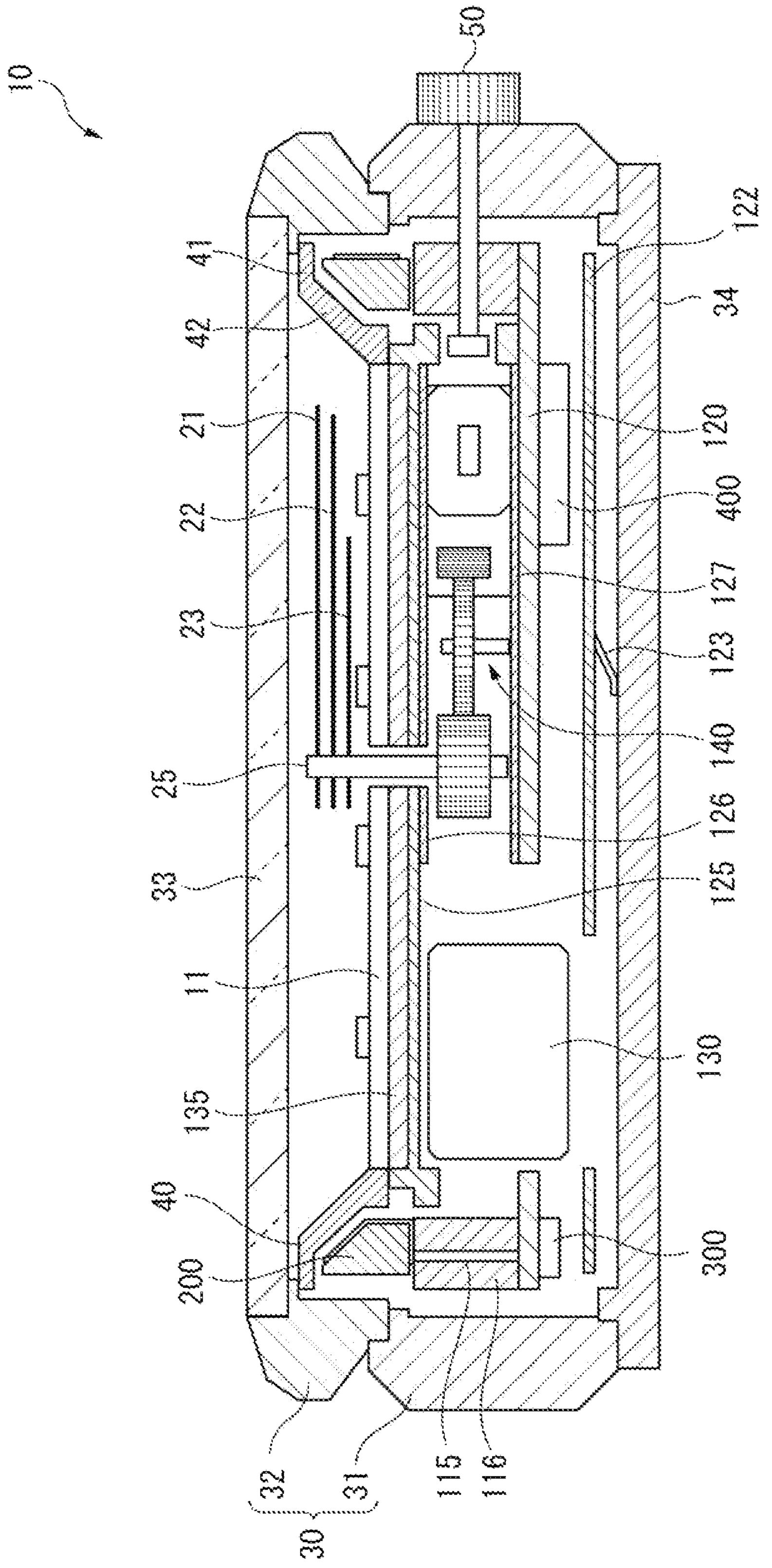
FIG. 2 is a front view illustrating the electronic watch according to the exemplary embodiment of the present disclosure.
Figure 3:
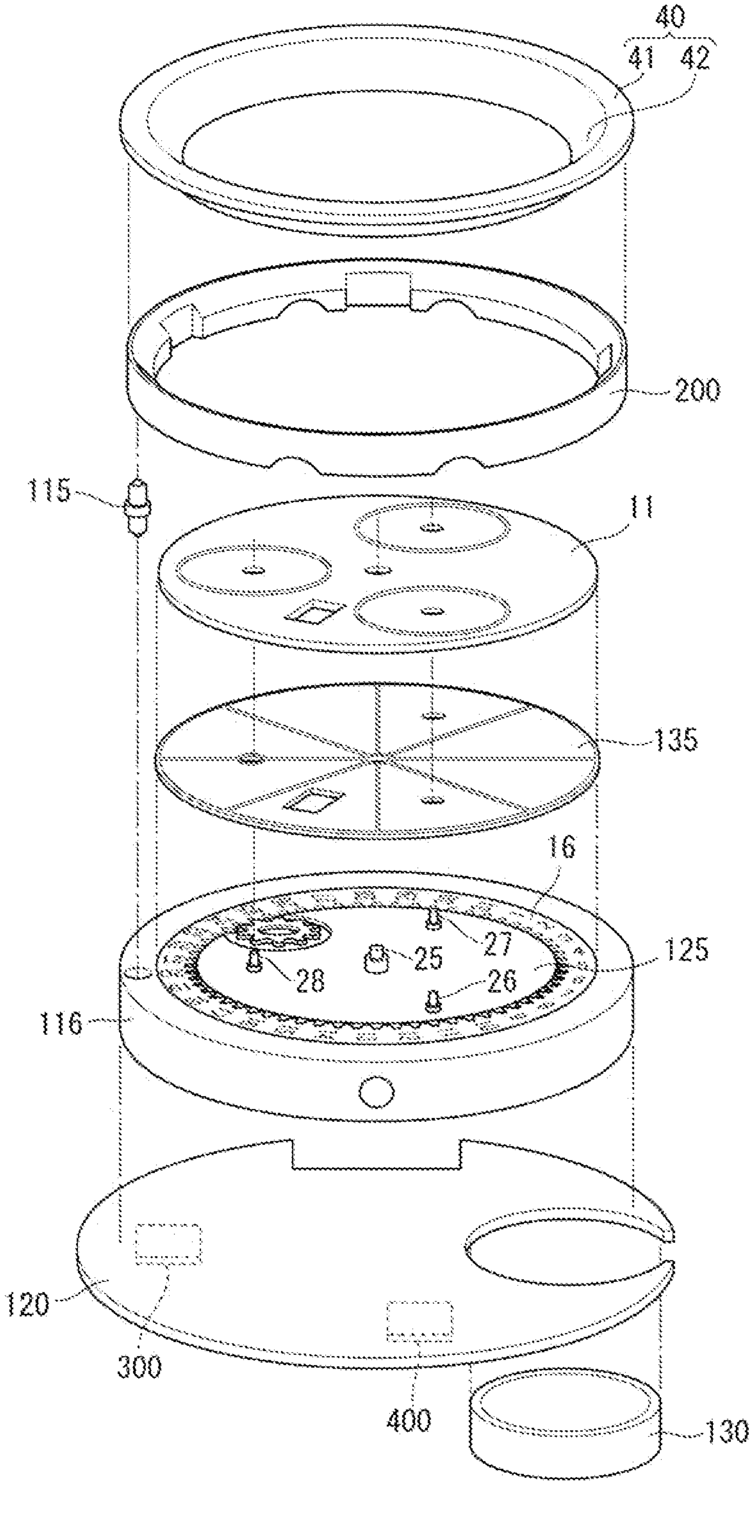
FIG. 3 is an exploded perspective view illustrating a main portion of the electronic watch of the exemplary embodiment.

FIG. 1 is a plan view of an electronic watch 10 viewed from a surface side, FIG. 2 is a cross-sectional view illustrating a schematic of the electronic watch, and FIG. 3 is an exploded perspective view of a main portion of the electronic watch 10.

The electronic watch 10 is a watch that receives radio waves from a GPS (Global Positioning System) satellite to modify an internal time. The watch displays a time on a surface (hereinafter, referred to as a "front surface") opposite to a surface on a side that comes into contact with an arm (hereinafter referred to as the "rear surface"). The GPS satellite is a navigation satellite that orbits on a predetermined trajectory over the earth. The GPS satellite transmits a navigation message on the ground by superimposing the navigation message on a radio wave (L1 wave) of 1.57542 GHz. In the following description, the radio wave of the 1.57542 GHz, on which the navigation message is superimposed, is referred to as a satellite signal. The satellite signal has circular polarization of the right-hand polarization.

As illustrated in FIGS. 1 and 2, the electronic watch 10 includes an outer case 30, a cover glass 33, and a metal case back 34. The outer case 30 is configured by fitting a metal bezel 32 with a metal cylindrical case 31.

On a side surface of the outer case 30, with regard to the center of a dial 11, an A-button 61 is provided at a position in an 8 o'clock direction, a B-button 62 is provided at a position in a 10 o'clock direction, a C-button 63 is provided at a position in a 2 o'clock direction, a D-button 64 is provided at a position in a 4 o'clock direction, and a crown 50 is provided at a position in a 3 o'clock direction.

Inside the outer case 30, provided are a dial ring 40 attached to an inner circumference of the bezel 32, an optically transparent dial 11, a hand shaft 25 that passes through the dial 11, hands 21, 22, 23 that orbit around the hand shaft 25, and a driving mechanism 140 that drives hands 71, 81, 91 and a calendar wheel 16 (not illustrated in FIG. 2).

The hand shaft 25 is provided through the planar center of the outer case 30 and along a front/back direction (i.e. a thickness direction of the electronic watch 10). The hands 21, 22, 23 are attached to the hand shaft 25.

At the dial 11, provided are a first small window 70 having a circular shape and the hand 71 in the 2 o'clock direction, a second small window 80 having a circular shape and the hand 81 in the 10 o'clock direction, a third small window 90 having a circular shape and the hand 91 in the 6 o'clock direction, and a calendar small window 15 having a rectangular shape in the 4 o'clock direction. The dial 11, the hands 21, 22, 23, the first small window 70, the second small window 80, the third small window 90, the calendar small window 15, etc. are visible through the cover glass 33 attached to an aperture of the bezel 32.

In addition, the calendar wheel 16 is disposed at a rear surface side of the dial 11, where the calendar wheel 16 is visible through the calendar small window 15.

The dial 11 is a circular plate material that displays a time inside the outer case 30. The dial 11 is formed of a synthetic resin optically transparent material, and includes hands 21, 22, 23 etc. between the cover glass 33 and the dial 11. The dial 11 is disposed inside the dial ring 40. The dial 11 of the present exemplary embodiment is made of polycarbonate.

A solar panel 135 that generates optical power is disposed between the dial 11 and a main plate 125 to which the drive mechanism 140 is attached. As also illustrated in FIG. 3, the solar panel 135 is a circular plate coupled in series with a plurality of solar cells that convert light energy into electrical energy. A hole and an opening portion of the calendar small window 15 are formed in the dial 11, the solar panel 135, and the main plate 125. The hole is pass through by the hand shaft 25, the hand shaft 26 of the hand 71, the hand shaft 27 of the hand 81, and the hand shaft 28 of the hand 91.

The drive mechanism 140 is attached to the main plate 125, and is covered from the rear surface side at circuit board 120. The drive mechanism 140 has a step motor and a ring train such as a gear. In the present exemplary embodiment, a drive mechanism that drives the hand 22 and the hand 23 is provided. Further, a drive mechanism that independently drives the hand 21, the hand 71, the hand 81, the hand 91, and the calendar wheel 16 is provided. Note that in the present exemplary embodiment, the hand 21 is a chronograph seconds hand, the hand 71 is a chronograph minute hand, the hand 81 is a seconds hand, the hand 91 is a chronograph hour hand, and the calendar wheel 16 is a day indicator.

Magnetic shield plates 126, 127 are provided at the dial 11 side and the circuit board 120 side of the drive mechanism 140.

The circuit board 120 includes a GPS receiver 300 and a control display unit 400. At the case back 34 side (rear surface side) provided with the GPS receiver 300 and the control display unit 400 of the circuit board 120, a circuit clamp 122 for covering these circuit components is provided. A secondary battery 130, such as a lithium ion battery, is provided between the main plate 125 and the case back 34, and is charged with the power generated by the solar panel 135.

The circuit clamp 122 is provided with an opening for accommodating the secondary battery 130 within the outer case 30. The circuit clamp 122 is constituted of a metal plate, and have a conduction spring portion 123 that contacts the case back 34.

The dial ring 40 is constituted of a ring-shaped synthetic resin material provided with a flat plate portion 41 and an inclined portion 42. The dial ring 40 of the present exemplary embodiment is made of ABS (Acrylonity Butadiene Style).

The flat plate portion 41 is provided parallel to the cover glass 33, and an outer peripheral end thereof is in contact with an inner circumferential surface of the bezel 32. The inclined portion 42 extends from the flat plate portion 41, and an inner peripheral end thereof contacts the dial 11. The surface of the inclined portion 42 (i.e., an inner circumferential surface of the dial ring 40) is inclined toward the rear surface of the electronic watch 10 (i.e., downward), from an upper end that contacts the flat plate portion 41 to an lower end that contacts the dial 11. Thus, the inner circumferential surface of the dial ring 40 has a smaller height with respect to the dial 11 toward an interior of the electronic watch 10, whereby the dial 11 can be viewed in a wide angular range.

A donut-shaped accommodation space is formed by the dial ring 40 and the bezel 32. The annular antenna body 200 is accommodated in the accommodation space. A main plate bridge 116 formed in an annular shape is disposed between the antenna body 200 and the circuit board 120. The antenna body 200 is electrically coupled to the circuit board 120 by an feed pin 115 provided through the main plate bridge 116.

Moreover, a ground pattern of the circuit board 120 is electrically coupled to the metal case back 34 via the conduction spring portion 123 of the circuit clamp 122. The outer case 30 and the case back 34 can also be used as a ground plane together with the circuit board 120. By utilizing the outer case 30 and the case back 34 as the ground plane, an area of the ground plane can be increased. Thus antenna gain can be improved, whereby antenna characteristics can be improved.

Since the dial ring 40 is formed of a non-electrically conductive material such as a synthetic resin, radio wave reception by the antenna body 200 is not hindered. In addition, since the dial ring 40 covers the antenna body 200, the antenna body 200 is hidden. This prevents providing a sense of discomfort in appearance of electronic watch 10, whereby the design of electronic watch 10 can be improved.

Circuit Configuration of Electronic Watch

Figure 4:
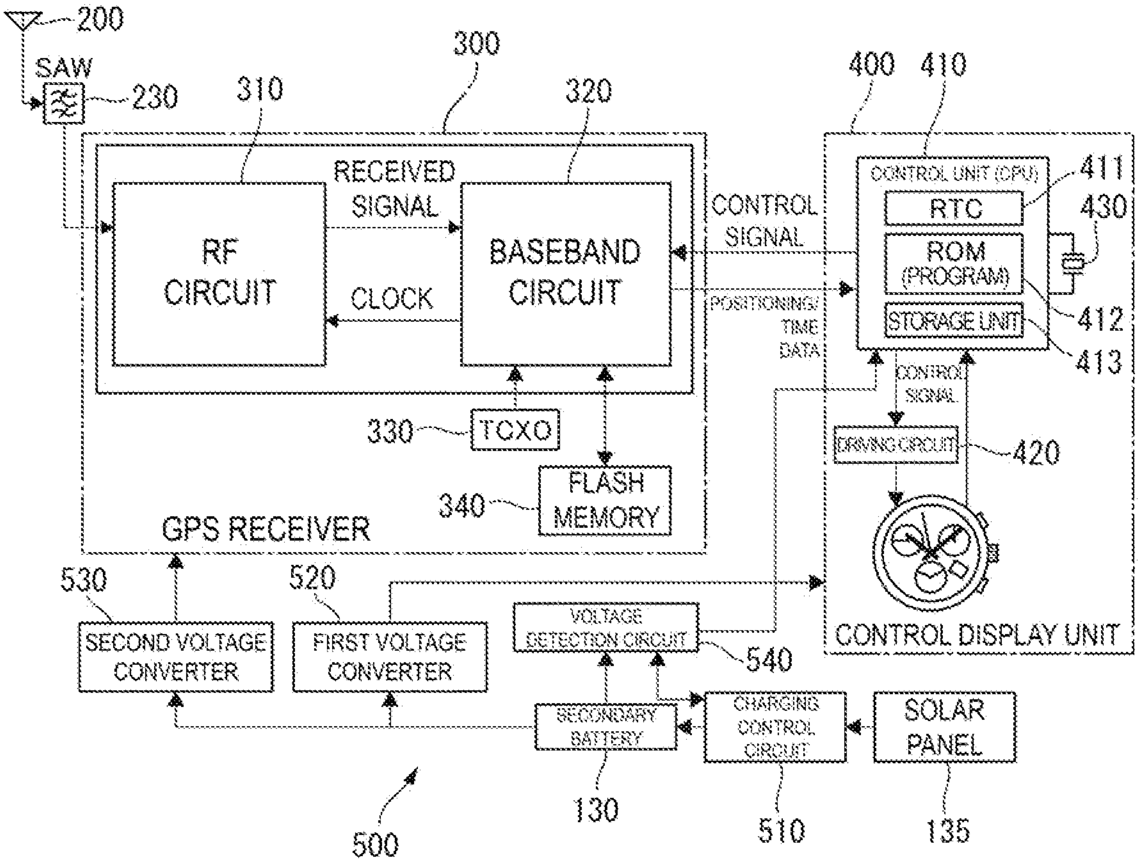
FIG. 4 is a block diagram illustrating a circuit configuration of the electronic watch of the exemplary embodiment.

FIG. 4 is a block diagram illustrating a circuit configuration of the electronic watch 10.

The electronic watch 10 includes the GPS receiver 300, the control display unit 400, and a power feed portion 500 disposed at the circuit board 120.

GPS Receiver

The GPS receiver 300 receives and processes satellite signals from the GPS satellite via the antenna body 200 and a SAW (Surface Acoustic Wave) filter 230. The SAW filter 230 is a band-pass filter. The SAW filter 230 passes a satellite signal of 1.5 GHz. Note that a LNA (Low Noise Amplifier) may be inserted separately between the antenna body 200 and the SAW filter 230. The SAW filter 230 may also be incorporated into the GPS receiver 300.

The GPS receiver 300 processes the satellite signals that have passed through the SAW filter 230. The GPS receiver 300 includes a RF (Radio Frequency) circuit 310, a baseband circuit 320, a TCXO (crystal oscillator circuit) 330 with a temperature compensation circuit, and a flash memory 340.

The RF circuit 310 is common as an RF circuit for GPS reception with a PLL (Phase Locked Loop), a VCO (Voltage Controlled Oscillator), and a LNA (Low Noise Amplifier), a mixer, an IF filter, an ADC (A/D converter), etc.

The baseband circuit 320 is common as a baseband circuit for GPS reception with a DSP (Digital Signal Processor), a CPU (Central Processing Unit), an RTC (Real Time Clock), an SRAM (Static Random Access Memory), etc. The TCXO 330 and the flash memory 340 are also coupled to the baseband circuit 320.

The baseband circuit 320 calculates UTC (Universal Coordinated Time, which is time data) by performing correlation processing, positioning operations, etc. to acquire satellite time information and positioning data, inputting a received signal converted from the RF circuit 310 into a digital signal, and utilizing the leap seconds stored in the SRAM to correct the acquired satellite time information (i.e.

Z count). As a result, the baseband circuit 320 outputs the positioning data and the time data to the control display unit 400.

A clock, which is a base of the local oscillation signal, is supplied from the TCXO 330 to the RF circuit 310 via the baseband circuit 320.

The flash memory 340 stores a time difference database, etc. in which positional information specified by latitude and longitude and time difference information for that location are associated with each other. When the GPS receiver 300 acquires positional information in a positioning mode, the GPS receiver 300 acquires the time difference information (i.e. the time difference with respect to the UTC) based on the positional information (latitude and longitude), and outputs the time difference to the control display unit 400.

Control Display Unit

The control display unit 400 includes a control unit (CPU) 410, a driving circuit 420 configured to implement a drive such as a hand, and a crystal oscillator 430.

The control unit 410 includes an RTC (Real Time Clock) 411, a ROM 412, and a storage unit 413. The control unit 410 counts a time and outputs a control signal to the GPS receiver 300 to control the operation thereof.

The RTC 411 uses a reference signal output from the crystal oscillator 430 to count the internal time. Various programs executed by the control unit 410 are stored in the ROM 412. In the present exemplary embodiment, the internal time that is counted by the RTC 411 is the UTC (Coordinated Universal Time). In a case where the control unit 410 has successfully received in the time measuring mode or the positioning mode, the control unit 410 updates the RTC 411 with the UTC output from the GPS receiver 300.

The storage unit 413 stores the satellite time information, the positioning information, and the time difference information output from the GPS receiver 300. For this reason, the control unit 410 calculates the time of current location by the UTC and the time difference information, drives the drive mechanism 140 by the driving circuit 420, and instructs the calculated time to be indicated by the hands 22, 23, and 81.

Power Supply Unit

The power supply unit 500 supplies power to the GPS receiver 300 and the control display unit 400. The power supply unit 500 includes the solar panel 135, a charging control circuit 510, the secondary battery 130, a first voltage converter 520, a second voltage converter 530, and a voltage detection circuit 540.

The charging control circuit 510 performs control to charge the power generated by the solar panel 135 to the secondary battery 130.

The secondary battery 130 supplies drive power to the control display unit 400 via the first voltage converter 520, and supplies drive power to the GPS receiver 300 via the second voltage converter 530.

A voltage detection circuit 540 monitors an output voltage of the secondary battery 130 and outputs the output voltage to the control unit 410. Thus, the control unit 410 can control the reception process by grasping the voltage of the secondary battery 130 detected by the voltage detection circuit 540.

Configuration of Antenna

Figure 5:
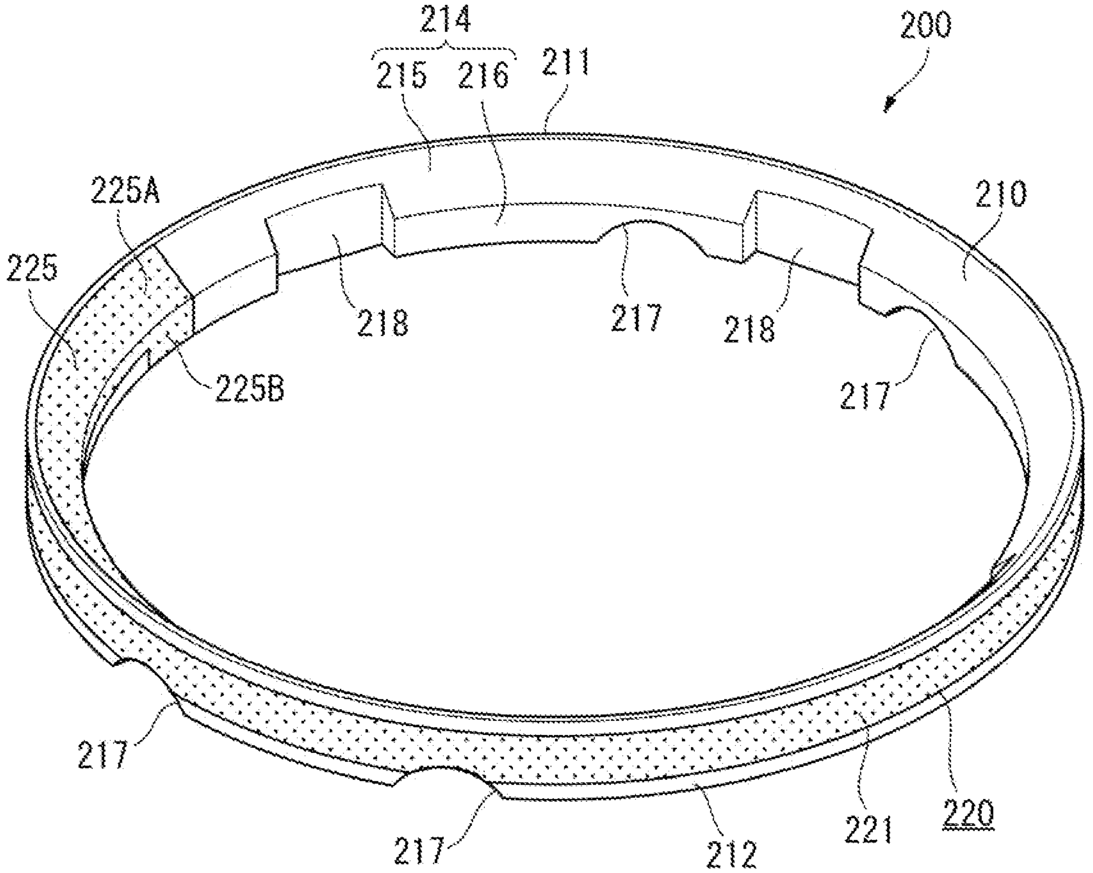
FIG. 5 is a perspective view illustrating an antenna body of the exemplary embodiment.
Figure 6:
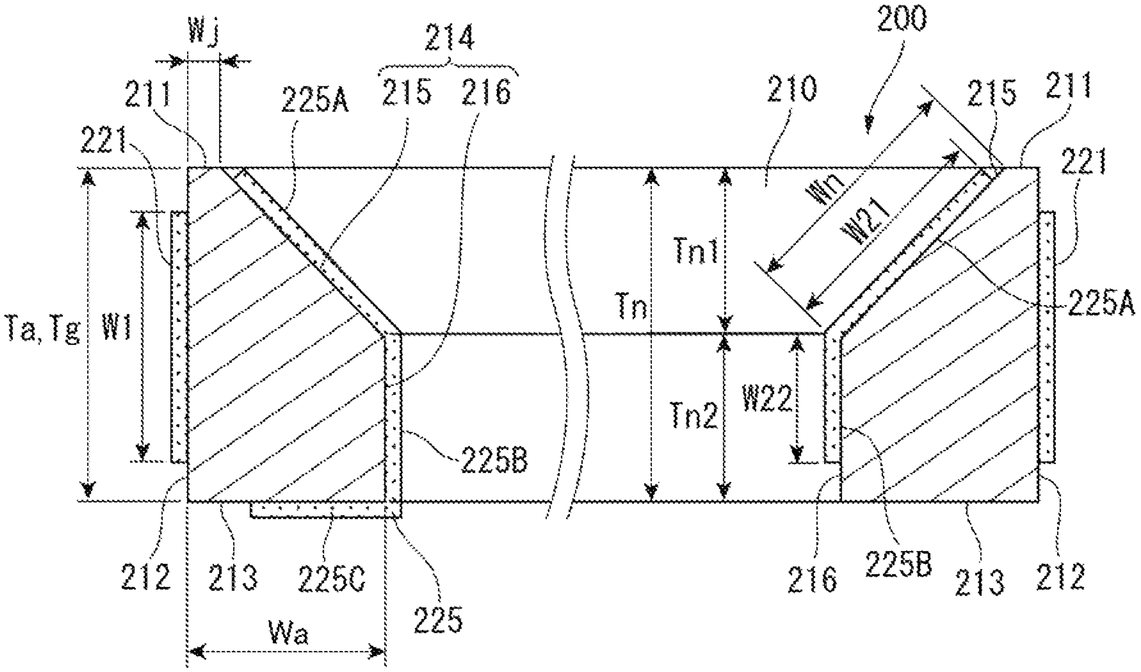
FIG. 6 is a cross-sectional view illustrating the antenna body of the exemplary embodiment.

As illustrated in FIG. 5 and FIG. 6, the antenna body 200, which is an antenna that receives a GPS satellite signal, uses a ring-shaped dielectric as an antenna base material 210. The antenna element 220 is formed at the antenna base material 210 by plating, silver paste printing, etc. The antenna base material 210 of the present exemplary embodiment has a complex shape in which concave portions 217, 218 are formed that avoid interference with other components such as the buttons 61 to 64, the solar panel 135, the dial 11, etc. In a case where the antenna element 220 is formed at the antenna base material 210 having such a complex shape, it is optimal to form the antenna element 220 by plating using a laser direct structure (LDS) process.

The frequency of the radio waves from the GPS satellite is approximately 1.575 GHz, and thus one wavelength thereof is approximately 19 cm. In order to receive the circular polarization, an antenna length of approximately 1.0 to 1.2 times the wavelength is required, so a loop antenna of approximately 19 to 24 cm is required to receive radio waves from the GPS satellite. When a loop antenna with such an antenna length is accommodated inside the watch, the watch will be larger.

In contrast, in the present exemplary embodiment, the antenna body 200 includes the ring-shaped antenna base material 210 formed of a dielectric having a relative permittivity $\varepsilon r$ of approximately 7 to 15, whereby the antenna length can be reduced by the wavelength reduction effect, and the antenna body 200 can be miniaturized to a size that can be accommodated within the watch.

Antenna Base Material

Next, a configuration of the antenna base material 210 will be described. Note that in the present exemplary embodiment, a center axial direction of the annular antenna base material 210 corresponds to an axial direction of the hand shaft 25, that is, a thickness direction of the electronic watch 10. Further, in the thickness direction of the electronic watch 10, the surface side of the electronic watch 10 is defined as upward and the rear surface side is defined as below.

The antenna base material 210 includes an upper surface 211, an outer circumferential surface 212, a bottom surface 213, and an inner circumferential surface 214. The inner circumferential surface 214 includes a first inner circumferential surface 215 continuous with the upper surface 211, and a second inner circumferential surface 216 provided between the first inner circumferential surface 215 and the bottom surface 213. The first inner circumferential surface 215 is inclined with respect to the center axis direction of the antenna base material 210. A lower end of the first inner circumferential surface 215 continuous with the second inner circumferential surface 216 is inclined toward the center axis of the antenna base material 210 with respect to an upper end of the first inner circumferential surface 215 continuous with the upper surface 211. In other words, the lower end of the first inner circumferential surface 215 is located further at the inner side of the antenna base material 210 than the upper end.

Further, the second inner circumferential surface 216 is formed along the thickness direction of the electronic watch 10. Thus, as illustrated in FIG. 6, when cut in a diameter direction, a cross section of the antenna base material 210 has a pentagonal shape. In the cross section of the antenna base material 210, a height dimension Tg of the outer circumferential surface 212 and a height dimension Tn of the inner circumferential surface 214 are greater than or equal to a width dimension Wj of the upper surface 211 and a width dimension Wa of the bottom surface 213. The cross section is set to be vertically long as a whole.

In the antenna base material 210 of the present exemplary embodiment, an arcuate concave portion 217 is formed at a portion that interferes with each button 61 to 64. Further, a plurality of concave portions 218 are formed in the inner circumferential surface 214 of the antenna base material 210. As described below, the concave portions 218 are formed to prevent interference with a fixing convex portion 135A and 11A of the solar panel 135 and the dial 11, as described below.

As a dielectric that forms the antenna base material 210, a ceramic dielectric material can be used at high frequencies such as titanium oxide. The ceramic dielectric material can be mixed with a synthetic resin and molded.

A base resin material of the dielectric is preferably a PPS (Poly-Sulfide), LCP (Liquid Crystal Polymer), and an polycarbonate, in that the electroless plating described below is easy to apply. As a result, the antenna body 200 can be miniaturized in combination with the wavelength reduction of the dielectric. For example, when the antenna base material 210 having a relative permittivity of εr is used, a wavelength reduction ratio by the antenna base material 210 is generally $(\varepsilon r)^{-1/2}$. That is, by using a dielectric having the relative permittivity of εr, the wavelength of the radio waves received by the antenna body 200 can be reduced. In other words, the antenna body 200 according to the present exemplary embodiment includes the antenna base material 210 having the relative permittivity of εr, whereby compared with the case where such an antenna base material is not provided, the antenna length of the antenna body 200 can be reduced and antenna size can be reduced.

The electroless plating that constitutes the antenna element 220 is made of copper, nickel, and gold. The thickness of the plating is as thin as about ten and several μm. Thus, in order to reduce the resistance value of the antenna element 220, the width of the antenna element 220 needs to be approximately 0.5 mm or greater.

Here, as illustrated in FIG. 6, the antenna base material 210 of the antenna body 200 of the present exemplary embodiment has a cross-sectional pentagonal shape. The width dimension Wj of the upper surface 211 is smaller than 0.5 mm. Thus, when the antenna element 220 is formed at the upper surface 211 of the antenna base material 210, the width of the antenna element 220 becomes narrower, and the antenna gain decreases due to the increased resistance value and the increased loss.

Thus, in the present exemplary embodiment, the first antenna element 221 is formed at the outer circumferential surface 212 of the antenna base material 210, and the second antenna element 225 is formed at the inner circumferential surface 214.

The first antenna element 221 is formed at the outer circumferential surface 212 of the antenna base material 210. The first antenna element 221 is formed in a C shape in which a portion of a circular ring is cut out in plan view of the antenna body 200 as viewed from the surface of the electronic watch 10. The first antenna element 221 has an antenna length that resonates with radio waves or satellite signals from the GPS satellite.

The second antenna element 225 is an arcuate element formed at the inner circumferential surface 214 of the antenna base material 210. The second antenna element 225 includes a first inner circumferential portion 225A formed at the first inner circumferential surface 215 and a second inner circumferential portion 225B formed at the second inner circumferential surface 216. Furthermore, the second antenna element 225 includes a feed terminal 225C formed at the bottom surface 213 at a portion of the antenna base material 210 in a circumferential direction (at the 6-o'clock position in the present exemplary embodiment).

A distance between the first antenna element 221 and the second antenna element 225 is set to be less than or equal to a dimension such that both elements are disposed facing each other with the antenna base material 210 interposed therebetween in a portion in the circumferential direction of the antenna base material 210 and electromagnetically coupled to each other to function as elements that convert electromagnetic waves into electric current. In the present exemplary embodiment, the distance between the first antenna element 221 and the second antenna element 225 is greatest at the width dimension Wa between the outer circumferential surface 212 of the antenna base material 210 and the second inner circumferential portion 225B (i.e., the width dimension Wa of the bottom surface 213). The width dimension Wa, that is, the distance Wa between the first antenna element 221 and the second inner circumferential portion 225B of the second antenna element 225, is greater than 0 mm and less than or equal to 2.0 mm. In particular, in the present exemplary embodiment, the foregoing distance Wa is less than or equal to 1.5 mm, for example, 1.3 mm.

The second antenna element 225 is an element called a feed element or an excitation element, which is supplied via the feed terminal 225C. By appropriately setting the length of the second antenna element 225, the impedance of the GPS receiver 300 electrically coupled to the antenna body 200 can be matched with the impedance of the antenna body 200

Note that in the present exemplary embodiment, the angular range in the circumferential direction of the first antenna element 221 is set in a range of 170 degrees to 330 degrees, for example. In addition, the angular range in the circumferential direction of the second antenna element 225 is set in a range of 40 degrees to 160 degrees, for example. FIG. 6 is a cross-sectional view of the position where the first antenna element 221 and the second antenna element 225 are disposed facing each other. The left side view of FIG. 6 is a cross-sectional view at the 6-o'clock position in which the feed terminal 225C is formed, and the right side view of FIG. 6 is a cross section at the 3-o'clock position.

The width of the first antenna element 221 and the second antenna element 225 is 0.5 mm or greater. In the present exemplary embodiment, the width of each antenna element 221, 225 is 1 mm or greater even for a thin portion. The other portion is set to be 2 mm or greater. Since the first antenna element 221 is provided at the outer circumferential surface 212, the width W1 of the first antenna element 221 is set to be less than or equal to the height dimension Tg of the outer circumferential surface 212. Since the second antenna element 225 is provided at the inner circumferential surface 214, a total dimension of the width W2 of the second antenna element 225 (i.e., the total dimension of the width W21 of the first inner circumferential portion 225A and the width W22 of the second inner circumferential portion 225B) is set to be less than or equal to the total dimension of the width Wn of the first inner circumferential surface 215 of the inner circumferential surface 214 and the height dimension Tn2 of the second inner circumferential surface 216. Note that in the present exemplary embodiment, the height dimension Tn of the inner circumferential surface 214 of the antenna element 220 is the total dimension of the height dimension Tn1 of the first inner circumferential surface 215 and the height dimension Tn2 of the second inner circumferential surface 216. The height dimension Ta of the antenna base material 210 and the height dimension Tn of the inner circumferential surface 214 are the same as the height dimension Tg of the outer circumferential surface 212.

As a result, the antenna body 200 has a small resistance value and a small loss, whereby it is possible to obtain high antenna performance. In addition, since the aforementioned wavelength reduction effect increases the reduction effect depending on an area in contact with the dielectric, widening the width of the antenna element 220 is effective in reducing the antenna diameter. Furthermore, by increasing the width of the antenna element 220, a frequency band of the antenna body 200 can be widened, whereby the antenna element 200 is not susceptible to variations in assembly dimensions, and stable antenna characteristics can be achieved.

Next, a mounting structure of the antenna body 200, the solar panel 135, the dial 11, and the dial ring 40 will be described.

A plurality of cutout portions (not illustrated) are formed at the outer circumferential surface 212 of the antenna body 200, and flange portions are provided in the cutout portions. The antenna body 200 is fixed to the main plate bridge 116 by engaging the flange portion and a hook portion (not illustrated) of the main plate bridge 116.

Figure 7:
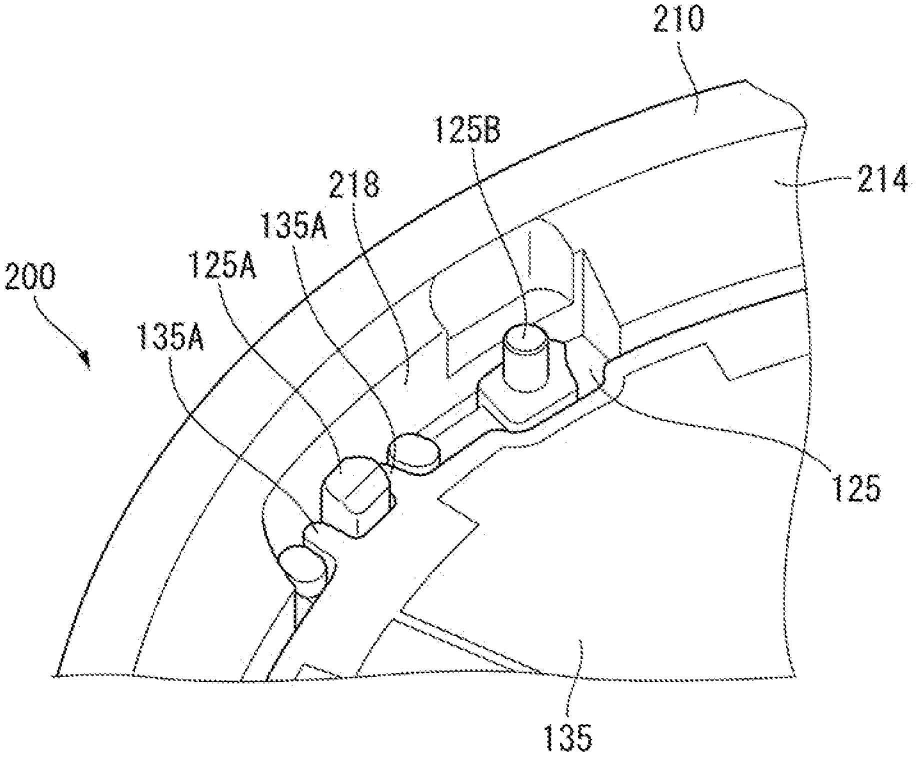
FIG. 7 is an enlarged perspective view illustrating a mounting structure of a solar panel of the exemplary embodiment.
Figure 8:
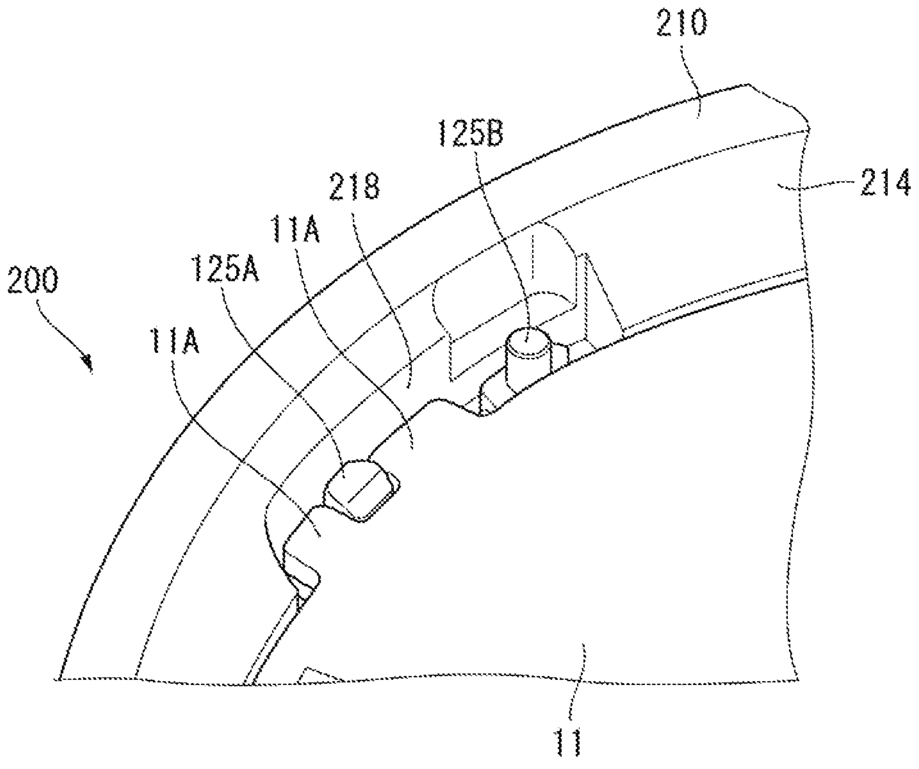
FIG. 8 is an enlarged perspective view illustrating a mounting structure of a dial of the exemplary embodiment.

As illustrated in FIGS. 7 and 8, the concave portions 218 are formed at a plurality of locations in the circumferential direction on the inner circumferential surface 214 of the antenna body 200. Fixing convex portions 125A formed in the main plate 125 are disposed in these concave portions 218.

As illustrated in FIG. 7, pairs of fixing convex portions 135A are formed in a plurality of locations at the solar panel 135. The solar panel 135 is fixed to the main plate 125 by fitting the fixing convex portion 125A into a groove portion between the pair of fixing convex portions 135A.

As illustrated in FIG. 8, pairs of fixing convex portions 11A are formed in a plurality of locations at the dial 11. The dial 11 is fixed to the main plate 125 by fitting the fixing convex portion 125A into a groove portion between the pair of fixing convex portions 11A.

A fixing pin 125B formed at the main plate 125 is disposed in the concave portion 218 of the antenna body 200. The dial ring 40 is fixed to the main plate 125 by fitting a hole (not illustrated) formed in the dial ring 40 on the fixing pin 125B.

The antenna body 200 is disposed at the outer periphery of the dial 11 and is disposed inside the bezel 32, and is covered by the dial ring 40 and the cover glass 33 formed of a synthetic resin, whereby it is possible to ensure good reception.

The antenna body 200 is fed through the feed terminal 225C, and the feed pin 115 is coupled to the feed terminal 225C as illustrated in FIGS. 2 and 3. The feed pin 115 is a pin-like connector formed of metal. The feed pin 115 is disposed through the main plate bridge 116, and abuts a terminal of the antenna feed circuit of the circuit board 120. As a result, the circuit board 120 and the antenna body 200 within the accommodation space are electrically coupled via the feed pin 115. Thus, the antenna feed circuit and the feed pin 115 of the circuit board 120 constitute a feed portion that couples to the feed terminal 225C of the second antenna element 225.

Characteristics of Antenna Body

Next, the characteristics of the antenna body 200 of the present exemplary embodiment will be described.

Figure 9:
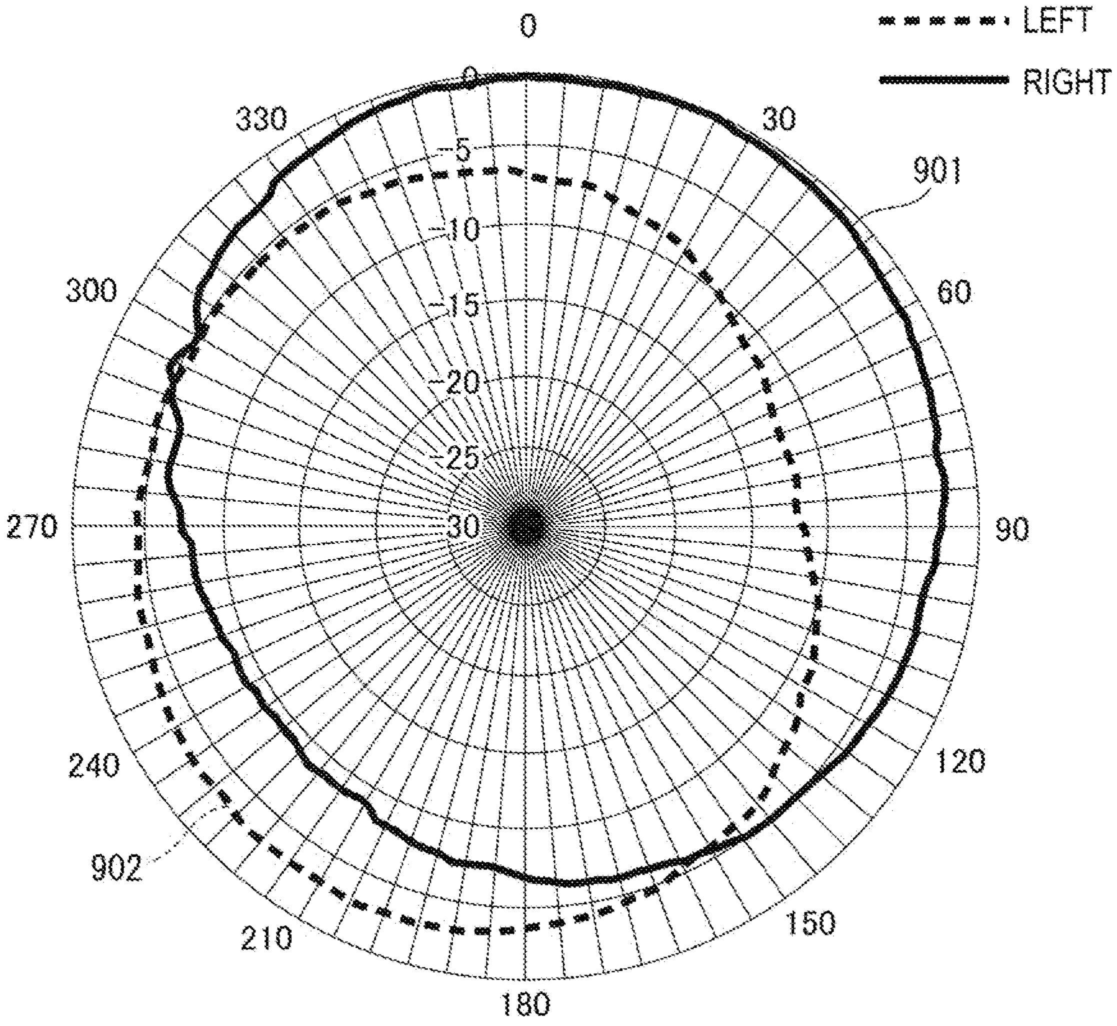
FIG. 9 is a characteristic diagram illustrating a radiation pattern of the antenna body.

FIG. 9 is a characteristic diagram illustrating a radiation pattern of the antenna body 200. In FIG. 9, a solid line 901 corresponds to the right-hand polarization profile of the antenna, and a dotted line 902 corresponds to the left-hand polarization profile of the antenna. In FIG. 9, the 0 degree corresponds to a front face direction of the dial, the 180 degree corresponds to a case back direction, and the 90 and 270 degrees correspond to side surface directions of the electronic watch 10. Thus, in the right-hand polarization profile, the directionality in the dial to case back direction (i.e., thickness direction of the electronic watch 10) is obtained. Thus, the antenna body 200 is an antenna suitable for receiving satellite signals that have circular polarization of the right-hand polarization.

Figure 10:
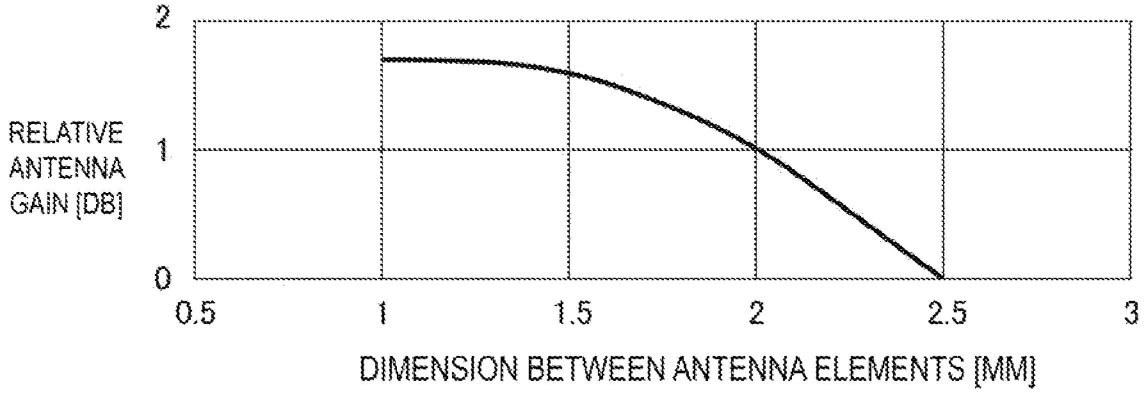
FIG. 10 is a graph illustrating characteristics of the antenna body.

Next, the graph of FIG. 10 illustrates a relationship between the dimension between the first antenna element 221 and the second antenna element 225 and relative antenna gain.

The graph in FIG. 10 is a simulation of calculating the antenna gain for the dimension between the first antenna element 221 and the second antenna element 225 as the relative antenna gain, with reference to the antenna gain in a case where the foregoing dimension is 2.5 mm.

From the simulation results illustrated in FIG. 10, it has been clarified that the antenna gain is improved when the width of the antenna base material 210 decreases and the dimension between the first antenna element 221 and the second antenna element 225 decreases. In particular, it has been clarified that when the dimension between the antenna elements 221 and 225 is 2 mm or less, and preferably 1.5 mm or less, the antenna gain is improved and the antenna characteristics can be improved.

Figure 11:
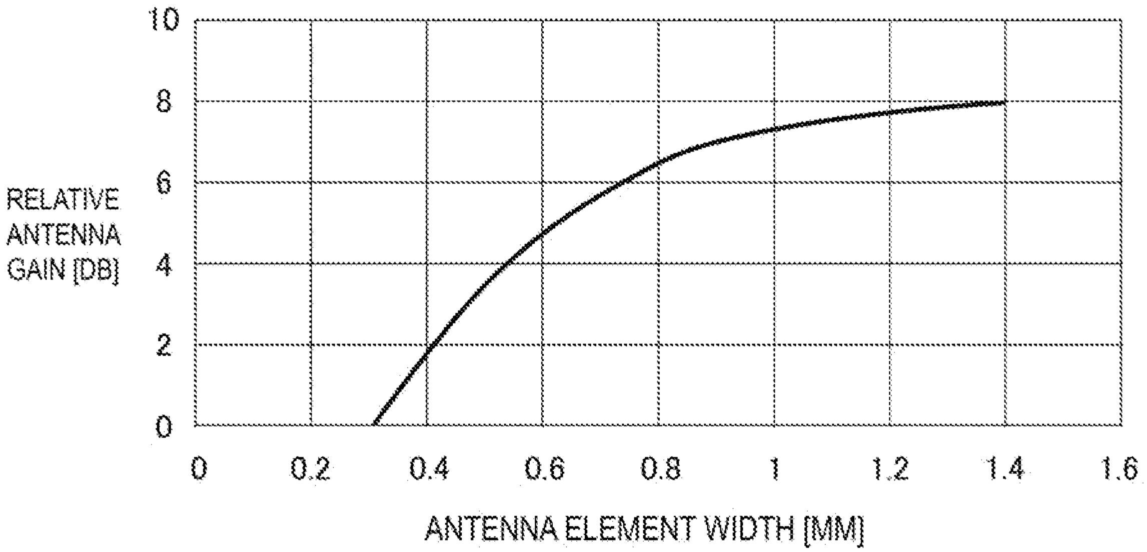
FIG. 11 is a graph illustrating characteristics of the antenna body.

Next, a relationship between the antenna element width and the relative antenna gain is illustrated in the graph of FIG. 11. The graph in FIG. 11 is a simulation of the relative antenna gain in accordance with the antenna element width with reference to a case where the antenna element width is 0.5 mm.

From the simulation results illustrated in FIG. 11, it has been clarified that the antenna gain is improved when the width of the antenna element 220 increases, that is, when the width of each of the first antenna element 221 and the second antenna element 225 increases. In particular, it has been clarified that when the width of each antenna element 221, 225 is 1.0 mm or greater, the antenna gain is improved and the antenna characteristics can be improved, compared to a case where the width was 0.5 mm.

Effect of Present Exemplary Embodiment

According to the antenna body 200 of the present exemplary embodiment, the first antenna element 221 is provided at the outer circumferential surface 212 of the antenna base material 210, and the second antenna element 225 is provided at the inner circumferential surface 214. Therefore, compared to the case where the antenna element is provided at the upper surface of the antenna base material 210, the width of the antenna element 220 can be increased, the antenna base material 210 can be made thinner while maintaining the antenna gain, and the electronic watch 10 can be miniaturized.

In addition, the distance Wa of the first antenna element 221 and the second antenna element 225 is greater than 0 mm and less than or equal to 2 mm, whereby the two antenna elements 221, 225 can easily be magnetically coupled to each other, the antenna gain can be improved, and the antenna characteristics can be improved.

In particular, in the present exemplary embodiment, the distance Wa between the two antenna elements 221, 225 is set to 1.5 mm or less, for example 1.3 mm, whereby the antenna characteristics can be further improved.

The widths W1 and W2 of the first antenna element 221 and the second antenna element 225 are set to 0.5 mm or greater, whereby the resistance of the antenna elements 221, 225 can be reduced and the antenna performance can be improved. In particular, in the present exemplary embodiment, the widths W1, W2 of the first antenna element 221 and the second antenna element 225 are set to 1.0 mm or greater, whereby the antenna characteristics can be further improved.

The inner circumferential surface 214 of the antenna base material 210 is constituted by the first inner circumferential surface 215 and the second inner circumferential surface 216, the first inner circumferential surface 215 is an inclined surface, whereby the dial ring 40 covering the antenna base material 210 can be provided along the inclined first inner circumferential surface 215, and the visibility of the dial 11 can be improved.

In addition, the first inner circumferential surface 215 and the second inner circumferential surface 216 are provided, whereby compared to a case where an inner circumferential surface is formed along the thickness direction of the electronic watch 10, the width of the second antenna element 225 formed across the first inner circumferential surface 215 and the second inner circumferential surface 216 can be increased, the resistance of the second antenna element 225 can be reduced, and the antenna performance can be improved.

The antenna base material 210 has a vertically elongated shape in a cross section obtained by cutting the ring-shaped antenna base material 210 in the radial direction, in which the height dimensions Tg and Tn of the outer circumferential surface 212 and the inner circumferential surface 214 are greater than the width dimensions Wj and Wa of the upper surface 211 and the bottom surface 213. Therefore, the width dimensions of the first antenna element 221 and the second antenna element 225 formed at the inner circumferential surface 214 and the inner circumferential surface 214 can be increased. Thus, the resistance of each antenna element 221, 225 can be reduced, the area of contact between the antenna elements 221, 225 and the antenna base material 210 that is a dielectric can also be large, and the wavelength reduction effect can be increased. Therefore, the antenna performance can be improved.

The antenna base material 210 is formed of the PPS, LCP, and polycarbonate, whereby it is possible to produce an antenna base material 210 having a high dielectric constant and low loss, and a complicated shape that is easily plated. The antenna elements 221 and 225 are formed by plating, whereby the antenna elements 221, 225 can be easily formed at the antenna base material 210 having a complex shape.

In particular, if the antenna base material 210 is formed of a dielectric having a relative permittivity of 7 or greater, the sufficient wavelength reduction effect can be obtained, and the antenna body 200 can be miniaturized.

The concave portion 218 is formed at the inner circumferential surface 214 of the antenna base material 210, as well as the fixing convex portion 125A and the fixing pin 125B that fix the solar panel 135, the dial 11, and the dial ring 40 are disposed in the concave portion 218. Therefore, compared to a case where the inner circumferential surface is provided outside the fixing convex portion 125A or the fixing pin 125B without forming a concave portion in the inner circumferential surface of the antenna base material, the antenna base material 210 can be made smaller in diameter, the antenna body 200 can be miniaturized, and the electronic watch 10 can be miniaturized.

Since the antenna body 200 is covered by dial ring 40 made of the synthetic resin, design properties can be improved without interfering with antenna performance. In addition, since the metal bezel 32 is used, the appearance of the electronic watch 10 can be improved and the sense of quality can be enhanced.

Other Exemplary Embodiments

Note that the present disclosure is not limited to the aforementioned exemplary embodiments described above, and variations, modifications, etc. within the scope in which the object of the present disclosure can be achieved are included in the present disclosure.

Figure 12:
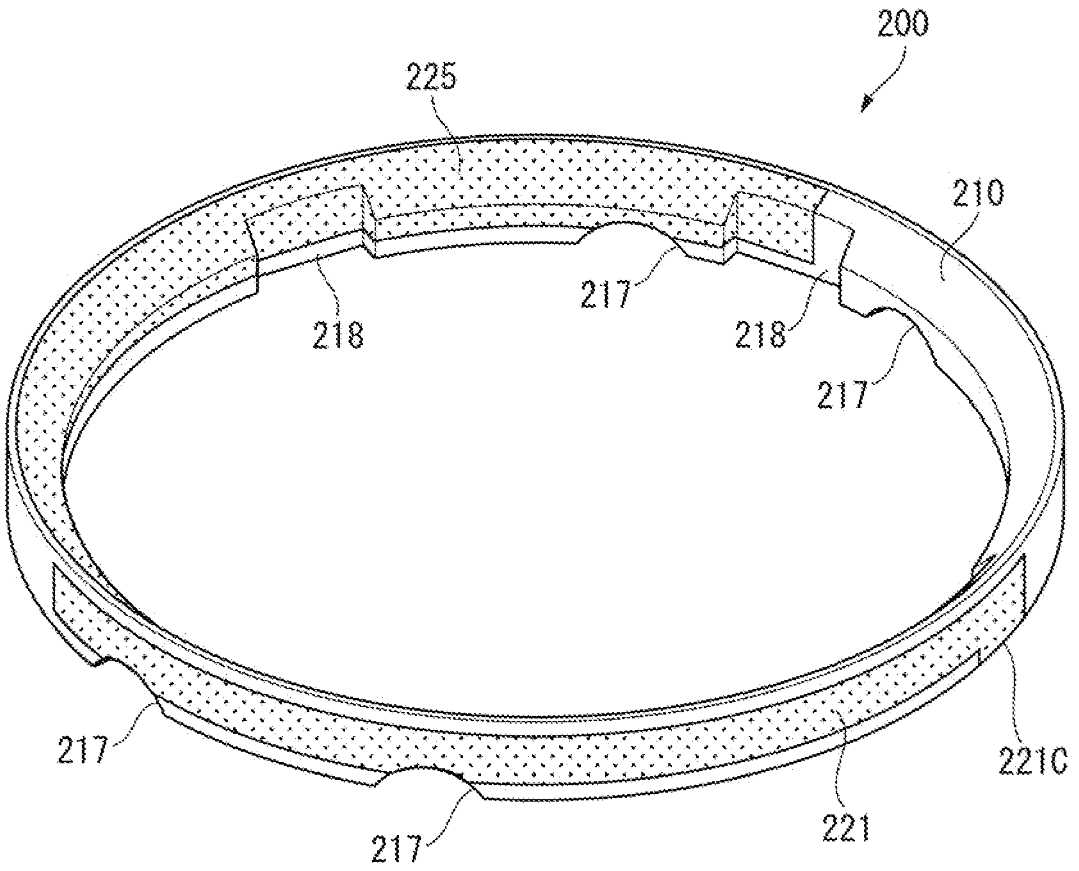
FIG. 12 is a perspective view illustrating an antenna body of a modified example.
Figure 13:
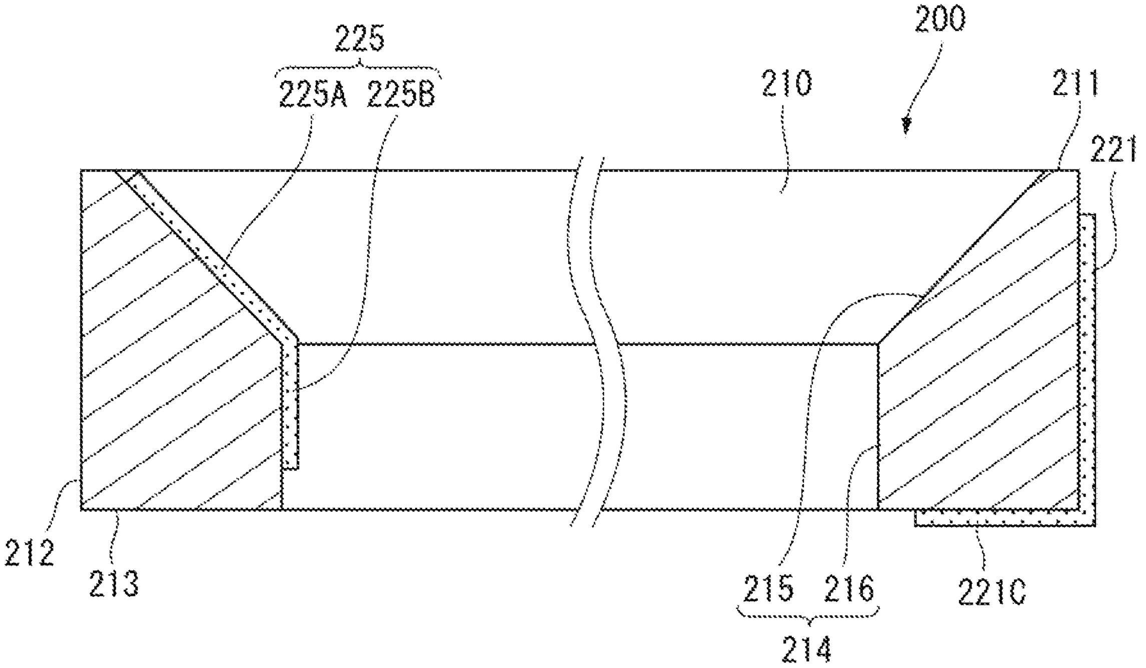
FIG. 13 is a cross-sectional view illustrating the antenna body of the modified example.

For example, in the exemplary embodiment described above, the feed terminal 225C is provided at the second antenna element 225, but as illustrated in FIG. 12 and FIG. 13, the feed terminal 221C may be formed at the first antenna element 221, and the first antenna element 221 formed at the outer circumferential surface 212 may be used as a feed element. In this case, the first antenna element 221 is formed in a range of approximately 40 degrees and approximately 160 degrees in the circumferential direction of the antenna base material 210, for example. The second antenna element 225 is formed in a range of approximately 170 degrees to approximately 330 degrees in the circumferential direction of the antenna base material 210, for example.

In the exemplary embodiment described above, the widths of the first antenna element 221 and the second antenna element 225 have been described as 0.5 mm or greater, while the feed terminal 221C and the feed terminal 225C provided at the first antenna element 221 or the second antenna element 225 have little effect on the antenna gain even when at least a portion of the width is thinner than 0.5 mm. Therefore, the description "the width of the first antenna element 221 and the second antenna element 225 is 0.5 mm or greater" means that a portion other than the power feed terminal 221C and the feed terminal 225C is 0.5 mm or greater.

The antenna base material 210 of the antenna body 200 is not limited to the cross-sectional pentagonal shape, and a cross-sectional rectangular antenna base material that does not include an inclined surface may be used. In this case as well, by forming the antenna base material in a cross-sectional vertically elongated shape, the widths of the first antenna element 221 and the second antenna element 225 formed at the outer circumferential surface and the inner circumferential surface can be increased, whereby the antenna performance can be improved. Note that in this case, the width W2 of the second antenna element 225 is set to be less than or equal to the height dimension of the inner circumferential surface. Further, for the antenna base material 210, the outer circumferential surface 212 may be a cross-sectional hexagon having a first outer circumferential surface along the central axis of the annular antenna base material 210 and a second outer circumferential surface that is inclined with respect to the foregoing center axis. At this time, the first inner circumferential surface and the second outer circumferential surface may be formed so as to be parallel with each other.

In the exemplary embodiment described above, the metal bezel 32 is used, while a ceramic bezel may also be used. With the ceramic bezel, the bezel portion can also pass through the satellite signal, thereby increasing the reception sensitivity.

The antenna base material 210 is not limited to a material having a relative permittivity of 7 or greater, and a material having a relative permittivity of less than 7 may be used depending on the type of radio waves to be received and the size of the antenna body 200, that is, the size of the electronic watch 10 that accommodates the antenna body 200, etc. Additionally, the antenna base material 210 may have a shape in which the concave portions 217 and 218 are not formed.

Summary of Present Disclosure

An electronic watch of the present disclosure includes an annular antenna base material including an upper surface, an outer circumferential surface, a bottom surface, and an inner circumferential surface, a first antenna element provided at the outer circumferential surface, and a second antenna element provided at the inner circumferential surface, wherein at least one of the first antenna element and the second antenna element includes a feed terminal coupled to a feed portion, and a distance between the first antenna element and the second antenna element is greater than 0 mm and less than or equal to 2 mm.

According to the electronic watch of the present disclosure, the first antenna element is formed at the outer circumferential surface of the antenna base material and the second antenna element is formed at the inner circumferential surface, whereby compared to the case where the antenna element is provided at the upper surface of the antenna base material, the width of the antenna element can be increased and the antenna gain can be improved.

In addition, the distance between the first antenna element and the second antenna element is greater than 0 mm and less than or equal to 2 mm, whereby the two antenna elements can easily be magnetically coupled to each other, and the antenna gain can also be improved at this feature, and the antenna characteristics can be improved.

In the electronic watch of the present disclosure, the distance between the first antenna element and the second antenna element is preferably greater than 0 mm and less than or equal to 1.5 mm.

The distance between the first antenna element and the second antenna element is greater than 0 mm and less than or equal to 1.5 mm, whereby the width of the antenna base material can be reduced, the diameter of the antenna base material can be miniaturized easily, and the electronic watch can be easily miniaturized.

In the electronic watch of the present disclosure, a width of the first antenna element and the second antenna element is preferably 0.5 mm or greater, and is less than or equal to a height of the outer circumferential surface and the inner circumferential surface. The width of each antenna element is 0.5 mm or greater, whereby the resistance value of the antenna element can be reduced, and the antenna gain can be improved.

In the electronic watch of the present disclosure, the inner circumferential surface may include a first inner circumferential surface provided continuously with the upper surface, and a second inner circumferential surface provided between the first inner circumferential surface and the bottom surface, the first inner circumferential surface may be inclined in a direction in which a lower end approaches a central axis of the antenna base material with respect to an upper end, the lower end being continuous with the second inner circumferential surface, the upper end being continuous with the upper surface, and the second antenna element may be provided continuously at the first inner circumferential surface and the second inner circumferential surface.

The inner circumferential surface is constituted by the first inner circumferential surface and the second inner circumferential surface, and the first inner circumferential surface is inclined so as to approach the central axis from the upper end toward the lower end, whereby the dial ring covering the antenna base material can be provided along the inclined first inner circumferential surface, and the visibility of the dial can be improved.

In the electronic watch of the present disclosure, a height dimension of the antenna base material may be greater than or equal to a width dimension of the antenna base material.

If the height dimension of the antenna base material is greater than or equal to the width dimension of the antenna base material, that is, if the cross section thereof is a vertically elongated shape, the large width of the first antenna element and the second antenna element can be ensured, and the antenna gain can be improved.

In the electronic watch of the present disclosure, the material of the antenna base material is any of polyphenylene sulfide, liquid crystal polymer, or polycarbonate, and the first antenna element and the second antenna element may be formed by plating.

If the material of the antenna base material is any of polyphenylene sulfide, liquid crystal polymer, or polycarbonate, then electroless plating is likely to be applied, the relative permittivity can be high, which can be suitable as an antenna base material.

The electronic watch of the present disclosure may include a dial disposed inside the antenna base material, wherein a concave portion, at which a fixing convex portion of the dial is disposed, may be formed at the inner circumferential surface. The fixing convex portion of the dial is disposed in the concave portion formed at the inner circumferential surface of the antenna base material, whereby the diameter of the antenna base material can be reduced, the antenna body can be miniaturized, and the electronic watch can be miniaturized.

In the electronic watch of the present disclosure, the antenna base material preferably has a relative permittivity of 7 or greater.

If the antenna base material is formed of a dielectric having a relative permittivity of 7 or greater, then the sufficient wavelength reduction effect can be obtained, and the antenna body can be miniaturized.

The electronic watch of the present disclosure may include a bezel disposed outside the antenna base material, wherein at least a portion of the bezel may be formed of an electrically conductive material.

If the electrically conductive material is used in a portion of the bezel, the appearance of the electronic watch can be improved and the sense of quality can be enhanced.

In the electronic watch of the present disclosure, the antenna base material may be covered by a dial ring made of synthetic resin.

By covering the antenna base material with the dial ring made of synthetic resin, design properties can be improved without interfering with antenna performance.

What is claimed is:

1. An electronic watch comprising:

an annular antenna base material including an upper surface, an outer circumferential surface, a bottom surface, and an inner circumferential surface;

a first antenna element provided at the outer circumferential surface; and a second antenna element provided at the inner circumferential surface, wherein at least one of the first antenna element and the second antenna element includes a feed terminal coupled to a feed portion, and a distance between the first antenna element and the second antenna element is greater than 0 mm and less than or equal to 2 mm.

2. The electronic watch according to claim 1, wherein the distance between the first antenna element and the second antenna element is greater than 0 mm and less than or equal to 1.5 mm.

3. The electronic watch according to claim 1, wherein a width of the first antenna element and the second antenna element is 0.5 mm or greater, and is less than or equal to a height of the outer circumferential surface and the inner circumferential surface.

4. The electronic watch according to claim 1, wherein the inner circumferential surface includes a first inner circumferential surface provided continuously with the upper surface and a second inner circumferential surface provided between the first inner circumferential surface and the bottom surface, the first inner circumferential surface is inclined in a direction so that a lower end thereof is closer to a central axis of the antenna base material than an upper end thereof is, the lower end being continuous with the second inner circumferential surface, the upper end being continuous with the upper surface, and the second antenna element is provided continuously at the first inner circumferential surface and the second inner circumferential surface.

5. The electronic watch according to claim 1, wherein a height dimension of the antenna base material is greater than or equal to a width dimension of the antenna base material.

6. The electronic watch according to claim 1, wherein a material of the antenna base material is any of polyphenylene sulfide, liquid crystal polymer, or polycarbonate, and the first antenna element and the second antenna element are formed by plating.

7. The electronic watch according to claim 1, comprising a dial disposed inside the antenna base material, wherein a concave portion, at which a fixing convex portion of the dial is to be disposed, is formed at the inner circumferential surface.

8. The electronic watch according to claim 1, wherein the antenna base material has a relative permittivity of 7 or greater.

9. The electronic watch according to claim 1, comprising a bezel disposed outside the antenna base material, wherein at least a portion of the bezel is formed of an electrically conductive material.

10. The electronic watch according to claim 1, wherein the antenna base material is covered by a dial ring made of synthetic resin.

* * * * *